(12) United States Patent
Funakura et al.

(10) Patent No.: US 8,764,052 B2
(45) Date of Patent: Jul. 1, 2014

(54) AIRBAG DEVICE

(71) Applicants: Calsonic Kansei Corporation, Saitama (JP); Calsonic Kansei North America, Inc., Shelbyville, TN (US)

(72) Inventors: Kazuki Funakura, Saitama (JP); Tomiharu Yamada, Saitama (JP); Koutarou Yamanaka, Shelbyville, TN (US); Naotoshi Ota, Shelbyville, TN (US); Marius Cociuba, Shelbyville, TN (US); Peng Lee, Shelbyville, TN (US)

(73) Assignees: Calsonic Kansei Corporation, Saitama (JP); Calsonic Kansei North America, Inc., Shelbyville, TN (US)

( * ) Notice: Subject to any disclaimer, the term of this patent is extended or adjusted under 35 U.S.C. 154(b) by 0 days.

(21) Appl. No.: 14/021,462

(22) Filed: Sep. 9, 2013

(65) Prior Publication Data

US 2014/0070521 A1  Mar. 13, 2014

(30) Foreign Application Priority Data

Sep. 10, 2012 (JP) ................................. 2012-198833

(51) Int. Cl.
*B60R 21/215* (2011.01)
(52) U.S. Cl.
USPC ..................................................... 280/728.3

(58) Field of Classification Search
USPC ............................................ 280/728.3, 743.2
See application file for complete search history.

(56) References Cited

U.S. PATENT DOCUMENTS

| | | | | |
|---|---|---|---|---|
| 5,215,330 A | * | 6/1993 | Kurita ........................ | 280/728.3 |
| 5,941,558 A | * | 8/1999 | Labrie et al. ............... | 280/728.3 |
| 6,955,376 B1 | * | 10/2005 | Labrie et al. ............... | 280/728.3 |

FOREIGN PATENT DOCUMENTS

JP        2008-174071 A        7/2008

* cited by examiner

*Primary Examiner* — Drew Brown
(74) *Attorney, Agent, or Firm* — Global IP Counselors, LLP (57) ABSTRACT

An airbag device includes an airbag main body, a storing section, an airbag lid member, a hinge section and a protective member. The airbag lid member has a lid section and an opening section. The lid section is configured to be opened by a pressing force of the airbag main body. The opening section is formed when the lid section is opened. The hinge section couples an edge portion of the opening section and the lid section. The protective member is configured and arranged to be disposed between the airbag main body and the hinge section when the airbag main body expands, and has a main protective section and a peripheral portion protective section. The peripheral portion protective section is provided on both sides of the main protective section to cover at least a peripheral portion of the lid section which protrudes from both sides of the hinge section.

4 Claims, 10 Drawing Sheets

AIRBAG DEVICE

CROSS-REFERENCE TO RELATED APPLICATIONS

This application claims priority to Japanese Patent Application No. 2012-198833, filed on Sep. 10, 2012. The entire disclosure of Japanese Patent Application No. 2012-198833 is hereby incorporated herein by reference.

BACKGROUND

1. Field of the Invention

The present invention relates to an airbag device in which a hinge section and the vicinity thereof can be protected more broadly and more securely.

2. Background Information

In a vehicle such as an automobile or the like, an instrument panel or a passenger compartment front section interior panel referred to as a dashboard or the like is installed in a front section of a passenger compartment.

In a part of the instrument panel on a front passenger seat side, an airbag device for a front passenger seat is installed as a safety device for protecting a front-seat passenger in case of an emergency.

The above-described airbag device for a front passenger seat has an airbag module which is configured by folding up a bag-shaped airbag main body and storing it in a storing section (module reservoir), and an airbag lid member which is attached to face an expanding port section (for example, an upper opening or a rear opening) formed on a surface of the storing section of the airbag module.

The airbag lid member has a lid section to be opened by a pressing force of the airbag main body, and an opening section which is formed by opening the lid section.

A support member for assisting the airbag lid member is attached to a back surface side of the airbag lid member. The support member has a lid section reinforcing section which reinforces the lid section, and a frame-shaped opening section reinforcing section which reinforces a circumferential portion of the opening section.

A hinge section for coupling the lid section reinforcing section and the opening section reinforcing section is integrally formed between the lid section reinforcing section and the opening section reinforcing section. The hinge section couples the circumferential portion of the opening section and the lid section of the airbag lid member, and serves as an opening base point (or an opening center) of the lid section. The hinge section is an extra length section which has a required roundabout shape.

Further, the support member has a guide frame section for attaching the above-described airbag module (the storing section thereof) which is integrally formed in an inner perimeter portion of the frame-shaped opening section reinforcing section (in a portion outside the hinge section with respect to a portion where the hinge section is located). The guide frame section also has a guide function of guiding the airbag main body toward the above-described opening section.

The guide frame section has a seizing hole for attaching the airbag module provided in a wall section on the front side and in a wall section on the back side, respectively. The seizing holes seize hook sections which are projected from a wall section on the front side and a wall section on the back side of the airbag module, respectively. The airbag module is installed in a lower portion of the guide frame section by seizing the hook sections with the seizing holes in a state where an upper portion of the airbag module is inserted inside the guide frame section.

Further, the guide frame section is inclined backward (inclined toward the back in the vehicle longitudinal direction) so as to guide expansion of the airbag main body into the passenger compartment. The running direction of the guide frame section which is inclined backward is an expanding direction of the airbag main body.

In the above-described airbag device, a configuration is known in which the airbag main body and the hinge section are protected by causing a protective member to stand between the airbag main body and the hinge section (especially, in the hinge section on the passenger side) when the airbag main body expands (for example, see Japanese Laid-Open Patent Publication No. 2008-174071).

Figure 9:
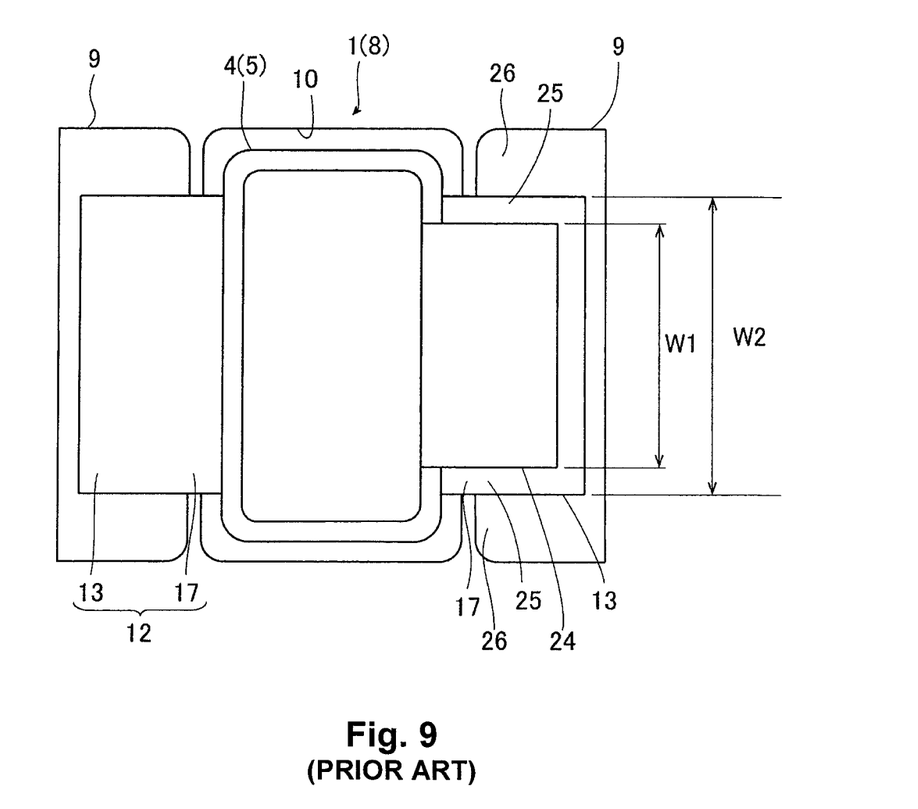
FIG. 9 is a plan view that shows a state in which a protective member according to a conventional art is spread.

As shown in FIG. 9, a portion of the protective member 24 which covers a hinge section 17 is formed of a cloth-shaped body having a width size W1 slightly smaller than a width side W2 of the hinge section 17 (W2>W1).

The reason why the protective member 24 is smaller than the hinge section 17 is because the airbag module for storing the protective member 24 is made slightly smaller than an opening section 10 of an airbag lid member 8 in which the hinge section 17 is provided, and the protective member 24 is formed to have a size which corresponds to the airbag module.

SUMMARY

As described above with reference to FIG. 9, since the protective member 24 is made slightly smaller than the hinge section 17 (W2>W1), it is difficult to completely cover the entire hinge section 17 with the protective member 24. Therefore, a non-protected portion 25 which cannot be covered with the protective member 24 is generated in portions on both sides of the hinge section 17.

Also, the protective member 24 cannot cover a portion (a peripheral portion) of a lid section 9 which laterally protrudes from the hinge section 17.

Further, the airbag main body is spread to become larger than the above-described opening section 10 in the passenger compartment. Therefore, the airbag main body puts a load on the lid section 9 from the outside of the lid section 9. However, the protective member 24 cannot receive such a load from outside.

Accordingly, the above-described protective member 24 has room for improvement.

The object of the present invention is thus to protect the hinge section 17 and the vicinity thereof more broadly and more securely by the protective member 24. In order to achieve the above-described object, according to a first aspect of the present invention, an airbag device includes a bag-shaped airbag main body, a storing section, an airbag lid member, a hinge section and a protective member. The storing section stores the airbag main body in a state of being folded up. The storing section includes an expanding port section formed on a surface thereof so that the airbag main body expands through the expanding port section. The airbag lid member has a lid section and an opening section. The lid section faces the expanding port section of the storing section, and is configured and arranged to be opened by a pressing force of the airbag main body when the airbag expands. The opening section is formed when the lid section is opened. The hinge section couples an edge portion of the opening section and the lid section of the airbag lid member to serve as an opening base point of the lid section. The protective member is configured and arranged to be disposed between the airbag main body and the hinge section, when the airbag main body expands, to protect the airbag main body and the hinge section. The protective member has a main protective section and a peripheral portion protective section. The main protective section is configured and arranged to cover the hinge section. The peripheral portion protective section is provided on both sides of the main protective section to cover at least a peripheral portion of the lid section which protrudes from both sides of the hinge section.

According to a second aspect of the present invention, in the airbag device, the protective member preferably further has a side edge portion protective section configured and arranged to cover at least a portion of the lid member adjacent to the hinge section in a side edge portion of the opening section in which the hinge section is not provided.

According to a third aspect of the present invention, in the airbag device, the protective member is preferably folded up in an accordion shape and arranged in a portion on a side of the opening section of the airbag main body in a state where a portion outside the main protective section of the protective member is folded in toward a back surface side of the main protective section with at least one of pleat folding and inward folding so as to fit into a width size of the main protective section, and thereafter the main protective section is folded up in the accordion shape, together with the portion folded in, so as to reduce a size of the airbag main body in an expanding direction.

According to the first aspect of the present invention, the following function effect can be achieved by the above-described configuration. Specifically, when the airbag main body is spread in case of an emergency, the spread airbag main body first expands from the expanding port section of the storing section, and presses the lid section of the airbag lid member so as to open the lid section. Then, the airbag main body expands from the opening section which appears due to opening of the lid section into the passenger compartment, and protects a passenger seated in a predetermined position of a seat by holding.

When the lid section is opened, the lid section is moved (rotated) toward the outside of the opening section with the hinge section being made an opening base point (an opening center). In this instance, the airbag main body and the hinge section can be prevented from directly scraping against each other by causing the protective member to stand between the airbag main body and the hinge section. Accordingly, the hinge section and the airbag main body can be protected, and the hinge section can also be protected from being damaged by the above-described scraping.

In this instance, particularly, by completely covering the entire hinge section with the main protective section of the protective member, the above-described protection of the hinge section can be made more secure. Specifically, the hinge section and the airbag main body can be completely prevented from directly scraping against each other, and a portion which hinders sliding can also be prevented from being generated between the airbag main body and the main protective section. Consequently, the hinge section and the airbag main body can be protected more effectively, and load (friction force) inputting to the hinge section due to the above-described scraping or physical damage to the hinge section due to the scraping can be prevented more securely.

Further, by covering the peripheral portion which protrudes from both side of the hinge section with the peripheral portion protective section which is provided on both sides of the main protective section in the lid section, the peripheral portion and the airbag main body can be prevented from directly scraping against each other, and sliding can be generated between the airbag main body and the peripheral portion protective section. Consequently, the peripheral portion and the airbag main body can be protected, and load (friction force) put to the hinge section due to the above-described scraping through the peripheral portion can be prevented or reduced.

As described above, in particular, the portions on both ends in the width direction of the hinge section can be protected securely (can be protected directly and indirectly).

According to the second aspect of the present invention, the following function effect can be achieved by the above-described configuration. Specifically, since the side edge portion protective section of the protective member covers at least a portion close to the hinge section (that is, a portion outside the peripheral portion protective section) in the side edge portion in which the hinge section of the opening section is not provided, the airbag main body can be spread in a sliding manner by holding a part of the side edge portion of the airbag main body with the side edge portion protective section. Consequently, the side edge portion protective section receives at least a part of load to the airbag main body acting on the lid section from the outside of the above-described peripheral portion, which makes it possible to prevent the above-described load from inputting to the hinge section through the peripheral portion or reduce the input load.

According to the third aspect of the present invention, the following function effect can be achieved by the above-described configuration. Specifically, the protective member folded up in an accordion shape is arranged in a portion on the opening section side of the airbag main body in a state where a portion outside the main protective section of the protective member is folded in toward a back surface side of the main protective section with at least either one of pleat folding or inward folding so as to fit into a width size of the main protective section, and thereafter the main protective section is folded up in an accordion shape, together with the portion folded in to fit into the width size, so as to reduce a size of the airbag main body in an expanding direction. Therefore, the protective member can be spread smoothly in accordance with spreading of the airbag main body. Also, the elements to be protected (the hinge section, the peripheral portion of the lid section, and the portion in the outside thereof) can be covered securely with each section (the main protective section and the portion outside the main protective section) of the spread protective member.

BRIEF DESCRIPTION OF THE DRAWINGS

Referring now to the attached drawings which form a part of this original disclosure:

FIG. 5(a) to FIG. 5(d) are views that show a process of folding up the protective member in an accordion shape.

FIG. 6(a) to FIG. 6(c) are perspective views that show a state of spreading the protective member when the airbag device is activated.

DETAILED DESCRIPTION OF EMBODIMENTS

Figure 1:
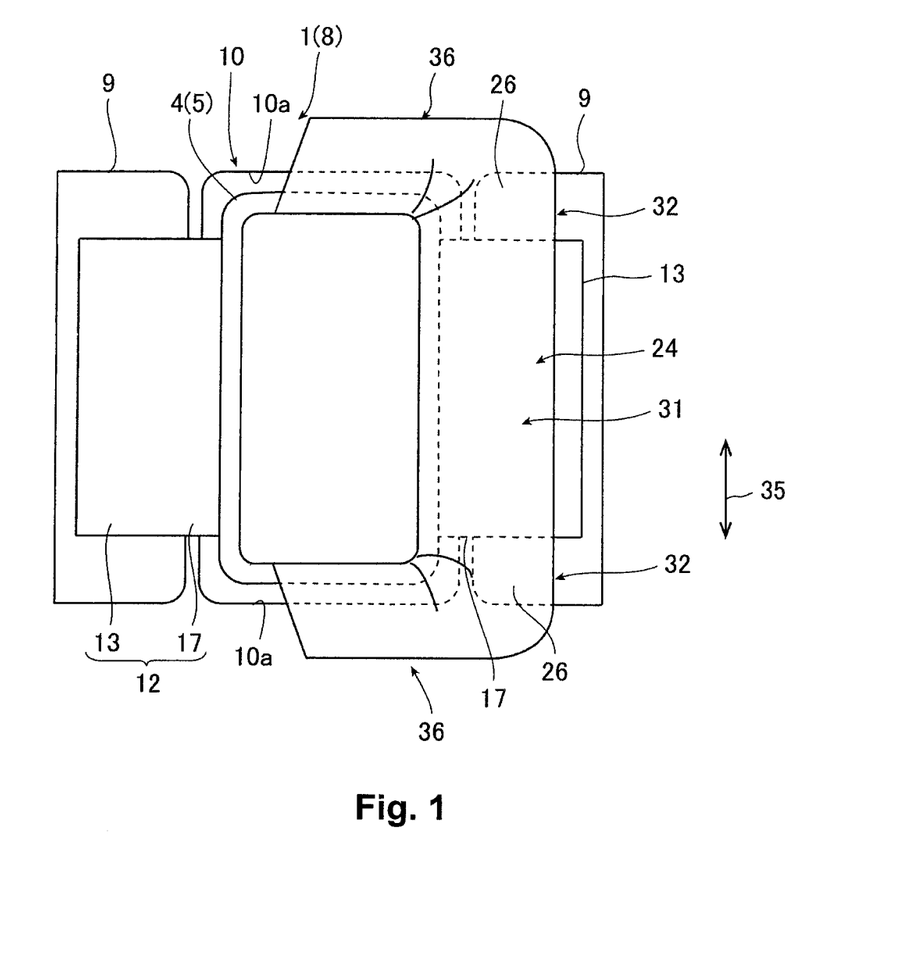
FIG. 1 is a plan view that shows a state in which a protective member according to an embodiment of the present invention is spread.
Figure 7:
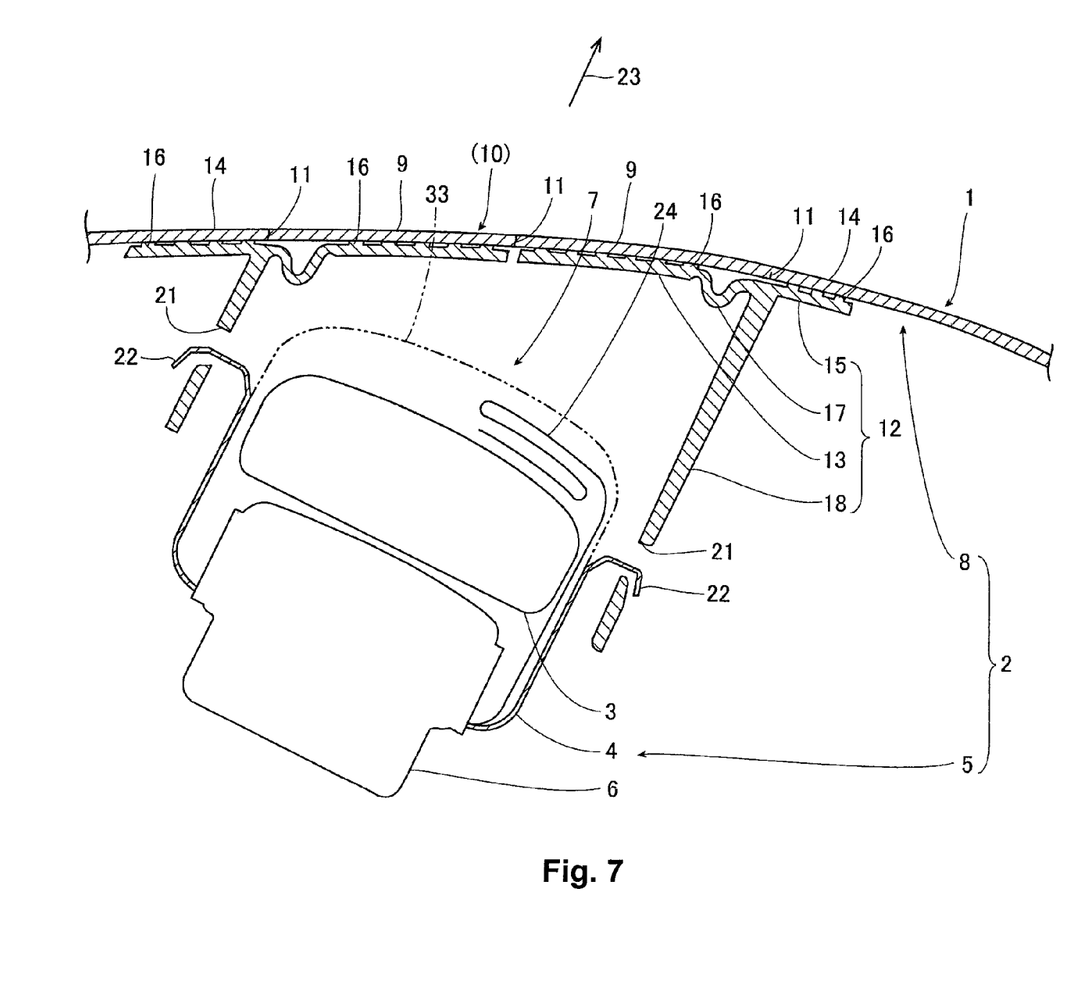
FIG. 7 is a vertical sectional view of an airbag device.
Figure 8:
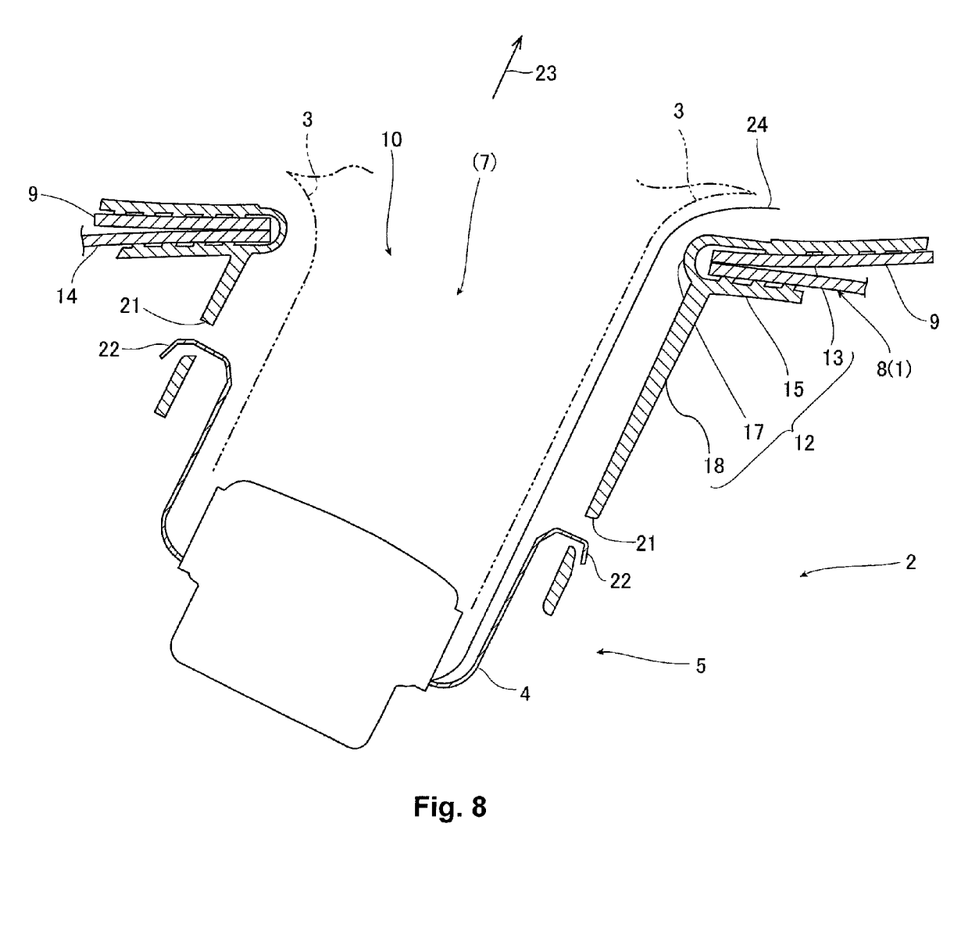
FIG. 8 is an activation view of the airbag device illustrated in FIG. 7.

Hereinafter, an embodiment of the present invention and an example implementing the embodiment will be explained in detail with reference to the drawings. FIG. 7, FIG. 8, and FIG. 1 show a basic configuration of the embodiment.

As shown in FIG. 7, in a vehicle such as an automobile or the like, an instrument panel 1 or a passenger compartment front section interior panel referred to as a dashboard or the like is installed in a front section of a passenger compartment.

In a part of the instrumental panel 1 on a front passenger seat side, an airbag device 2 for a front passenger seat is installed as a safety device for protecting a front-seat passenger in case of an emergency.

The above-described airbag device 2 for a front passenger seat has an airbag module 5 which is configured by folding up a bag-shaped airbag main body 3 and storing it in a storing section 4 (module reservoir), and an airbag lid member 8 which is attached to face an expanding port section 7 (for example, an upper opening or a rear opening) formed on a surface of the storing section 4 of the airbag module 5.

The above-described airbag main body 3 is configured by sewing a single cloth-shaped body or a plurality of sheets of cloth-shaped body in a sac shape.

The storing section 4 (module reservoir) is made of metal. An inflator 6 is attached to a bottom portion (a portion opposite to the expanding port section 7) of the storing section 4 of the above-described airbag module 5. The inflator 6 generates activating fluid for spreading the airbag main body 3 in case of an emergency.

The above-described airbag lid member 8 is made of a rigid resin material.

The airbag lid member 8 has a lid section 9 (movable section) to be opened by a pressing force of the airbag main body 3, and an opening section 10 (see FIG. 8) which appears by opening the lid section 9. The lid section 9 and the opening section 10 are provided in a position to face the expanding port section 7 of the storing section 4. The opening section 10 is made slightly larger than the expanding port section 7. The lid section 9 and the opening section 10 are provided by being partitioned from another part (a circumferential portion 14 described below) with a cleavage line 11 formed on the back surface side of the airbag lid member 8, and the cleavage line 11 has a depth which does not reach the front surface side of the airbag lid member 8.

The lid section 9 has types including a double-leaf type in which the lid section 9 is opened to a front side (backward in the vehicle longitudinal direction) and to a back side (frontward in the vehicle longitudinal direction), and a single-leaf type in which the lid section 9 is opened to the back side. In this embodiment, the lid section 9 is a double-leaf type, but the lid section 9 may be a single-leaf type.

The airbag lid member 8 has types including an integral type (so-called instrument-integral-type lid) in which the airbag lid member 8 is provided integrally with the instrument panel 1, and a separate type (so-called instrument-separate-type lid) in which the airbag lid member 8 is provided separately from the instrument panel 1 and the airbag lid member 8 is attached to a lid attachment opening section which is not shown in the drawing but is formed in the instrument panel 1 so as to be substantially flush.

Therefore, in the case of the instrument-integral-type lid, the airbag module 5 is directly attached to the inner surface of the instrument-integral-type lid in the instrument panel 1 (direct attachment type). In the case of the instrument-separate-type lid, the airbag module 5 is attached to the inner surface of the instrument-separate-type lid and is indirectly attached to the instrument panel 1 through the instrument-separate-type lid (indirect attachment type).

A support member 12 (or a reinforcing member) for assisting the airbag lid member 8 is attached to a back surface side of the airbag lid member 8. The support member 12 has a lid section reinforcing section 13 which reinforces the lid section 9, and a frame-shaped opening section reinforcing section 15 which reinforces the circumferential portion 14 (a fixing portion of the airbag lid section 8) of the opening section 10.

An adhesion rib 16 is appropriately provided on the upper surface of the lid section reinforcing section 13 and on the upper surface of the opening section reinforcing section 15, respectively, so as to adhere to the back surface side of the lid section 9 and to the back surface side of the circumferential portion 14 of the opening section 10.

A hinge section 17 for coupling the lid section reinforcing section 13 and the opening section reinforcing section 15 is integrally formed between the lid section reinforcing section 13 and the opening section reinforcing section 15. The hinge section 17 couples the circumferential portion 14 of the opening section 10 and the lid section 9 of the airbag lid member 8, and serves as an opening base point (or an opening center) of the lid section 9. The hinge section 17 is an extra length section which has a required (downward or inward) roundabout shape.

The hinge section 17 is provided in two positions which are an edge portion on the front side of the opening section 10 (for example, a back edge portion) and an edge portion on the back side of the opening section 10 (for example, a front edge portion) in a case where the lid section 9 is a double-leaf type. The hinge section 17 is provided in one position which is an edge portion on the back side of the opening section 10 in a case where the lid section 9 is a single-leaf type. However, the hinge section 17 is not provided in edge portions on both sides of the opening section 10 (for example, right and left edge portions).

Further, the support member 12 has a guide frame section 18 for attaching the above-described airbag module 5 (the storing section 4 thereof) which is integrally formed in an inner perimeter portion of the frame-shaped opening section reinforcing section 15 (in a portion outside the hinge section 17 with respect to a portion where the hinge section 17 is located). The guide frame section 18 also has a guide function of guiding the airbag main body 3 toward the above-described opening section 10.

The guide frame section 18 has a rectangular cross-sectional shape, and has a seizing hole 21 for attaching the airbag module 5 (the storing section 4 thereof) provided at least in a wall section on the front side and in a wall section on the back side, respectively. The seizing holes 21 seize hook sections 22 which are projected from a wall section on the front side and a wall section on the back side of the airbag module 5, respectively. The airbag module 5 is installed in a lower portion of the guide frame section 18 by seizing the hook sections 22 with the seizing holes 21 in a state where an upper portion of the airbag module 5 is inserted inside the guide frame section 18.

Further, the guide frame section 18 is inclined backward (inclined toward the back in the vehicle longitudinal direction) so as to guide expansion of the airbag main body 3 into the passenger compartment (backward inclined frame section). The running direction of the guide frame section 18 which is inclined backward is an expanding direction 23 of the airbag main body 3.

The support member 12 of this configuration is made of a rubber-based material or a soft resin material so as to secure variability of the hinge section 17. The support member 12 also has a type which is made of a metal thin plate. Further, in terms of the structure, the lid section 9 and the circumferential portion 14 of the opening section 10 can be connected directly by the hinge section 17.

Although it is not shown in the drawing, the lower portion of the airbag module 5 is fastened and fixed to a vehicle body strength member provided inside the instrument panel 1 through a fastening member such as a bolt and a nut. When the lower portion of the airbag module 5 is fastened to the vehicle body strength member, the above-described hook sections 22 are lifted slightly upward, thereby separating the hook sections 22 from the seizing holes 21 in the vertical direction. In other words, the hook sections 22 and the seizing holes 21 are configured to be inserted in a state of being loosely fit. With this configuration, in a state of being installed in the vehicle body, it is possible to prevent the airbag module 5 from pulling the airbag lid member 8 downward so as to deform the airbag lid member 8.

As shown in FIG. 1 and FIG. 8, a protective member 24 is provided in the above-described airbag device 2. The airbag main body 3 and the hinge section 17 are protected by causing the protective member 24 to stand between the airbag main body 3 and the hinge section 17 (especially, in the hinge section 17 on the passenger side) when the airbag main body 3 expands.

With respect to the above basic configuration, the protective member 24 has a configuration described below according to the following embodiment.

FIRST EMBODIMENT

Configuration

Hereinafter, the configuration will be explained.

FIG. 1 to FIG. 6 show this embodiment and its modified example. Here, FIG. 7 and FIG. 8 are also referred as needed.

Feature 1

As shown in FIG. 1, the above-described protective member 24 has a main protective section 31 which covers the above-described hinge section 17.

The protective section 24 has a peripheral portion protective section 32 which is provided on both sides of the main protective section 31 so as to cover at least a peripheral portion of the lid section 9 which protrudes from both side of the above-described hinge section 17.

Supplemental Explanation 1

Figure 2:
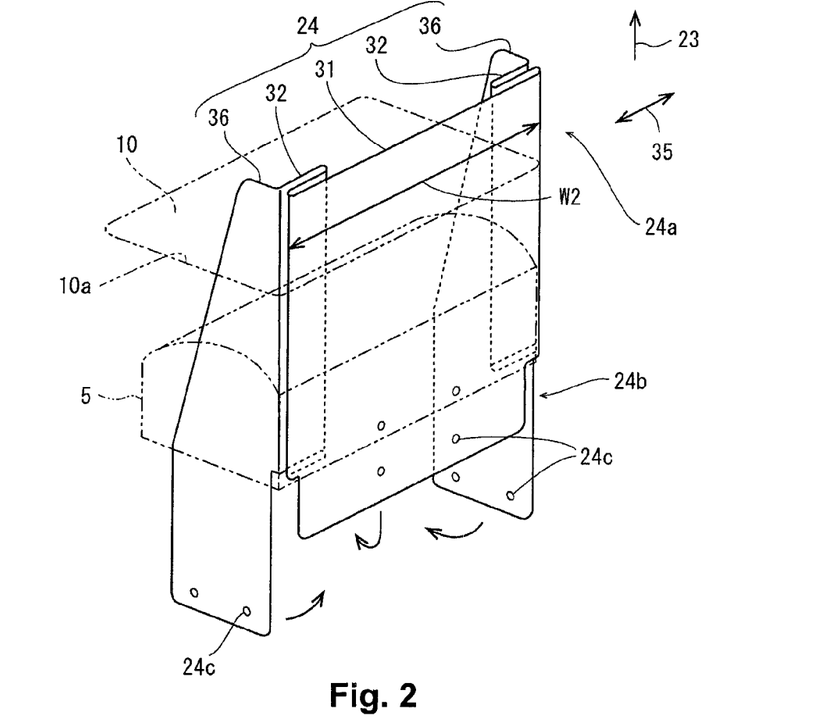
FIG. 2 is an overall perspective view of the protective member of FIG. 1.

Here, as shown in FIG. 2, the above-described "protective member 24" is a cloth-shaped body or a sheet-shaped body which has at least an expanded portion 24a which is expanded from the opening section 10 in accordance with spreading of the bag-shaped airbag main body 3, and a fixed portion 24b which is fixed to the storing section 4 or the like.

The expanded portion 24a of the protective member 24 has a length (a size in the vertical direction in FIG. 2) which at least can securely cover the hinge section 17 in the expanding direction 23. Preferably, as shown in FIG. 1, the expanded portion 24a of the protective member 24 has a length in the expanding direction 23 which can cover a portion of approximately ½ to ⅔ or more of the opened lid section 9. In this instance, the expanded portion 24a of the protective member 24 is formed to have a length to be projected toward the inside of the passenger compartment by approximately 70 mm with respect to the opening section 10, for example. However, the length by which the expanded portion 24a is projected from the opening section 10 is not limited to this.

On the other hand, the fixed portion 24b of the protective member 24 is formed integrally with a bottom portion or a side portion of the airbag main body 3 by sewing, for example. Alternatively, the protective member 24 is tightened together with other components (for example, the inflator 6 or the like) to a bottom portion or the like of the storing section 4 using a bolt or the like. In a case of tightening together in this manner, a bolt insertion hole 24c or the like can be appropriately provided in the fixed portion 24b of the protective member 24 as shown in FIG. 2.

As shown in FIG. 7, the protective member 24 is retained in a state of being folded up together with the airbag main body 3 such that the position thereof is not moved until being spread using a cover member 33, a press member, or the like. The cover member 33 or the press member is configured to be broken by a spreading force of the airbag main body 3, for example, when the airbag main body 3 is spread. Therefore, when the cover member 33 or the press member is broken, the protective member 24 is spread by a spreading force of the airbag main body 3. Incidentally, the protective member 24 has a type which is formed integrally with the above-described cover member 33 or press member. In this embodiment, the protective member 24 is configured as a separate member from the above-described cover member 33 or press member.

As shown in FIG. 1, the above-described "peripheral portion 26" is a portion between both sides of the hinge section 17 and both sides of the lid section 9 in the lid section 9.

The above-described "main protective section 31" has a size which can completely cover the hinge section 17 with respect to a width direction 35. That is, the size does not generate a non-protected portion 25 as shown in FIG. 9. For this purpose, the main protective section 31 has a width size which is equal to or slightly larger than a width side W2 of the hinge section 17 (see FIG. 9).

Figure 3:
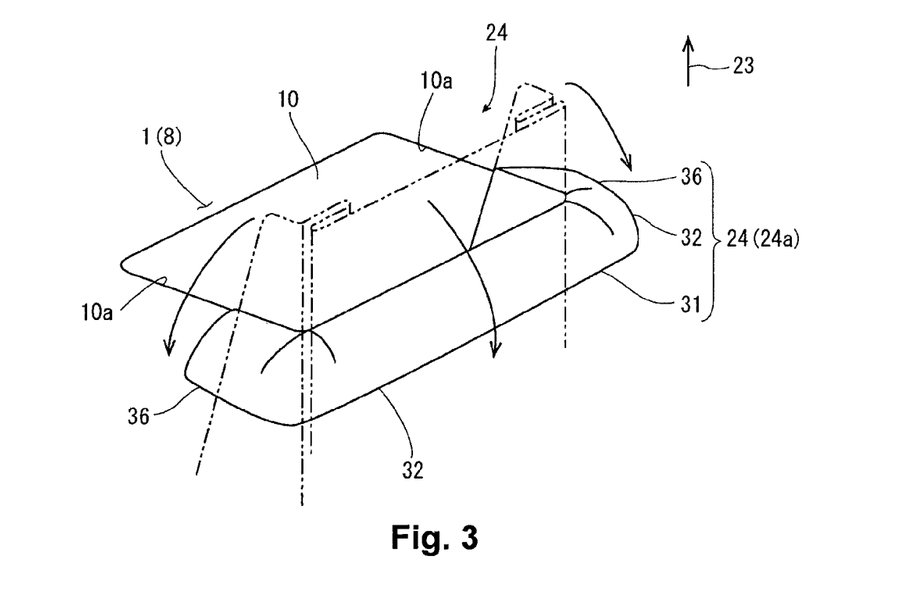
FIG. 3 is a perspective view that shows a state in which a portion coming from an opening section of the protective member of FIG. 2 is spread.
Figure 4A:
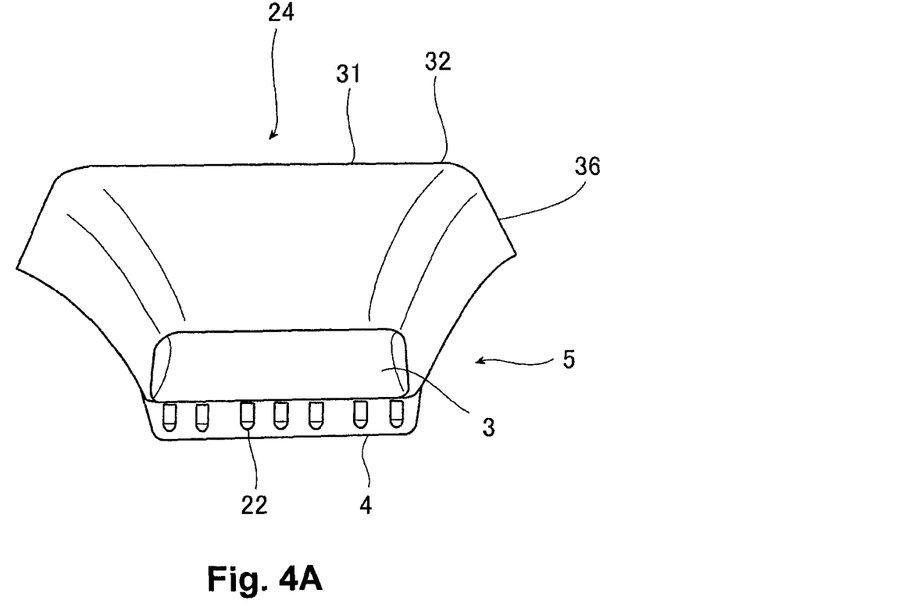
FIG. 4A is a view that shows a process of folding up the protective member.
Figure 4B:
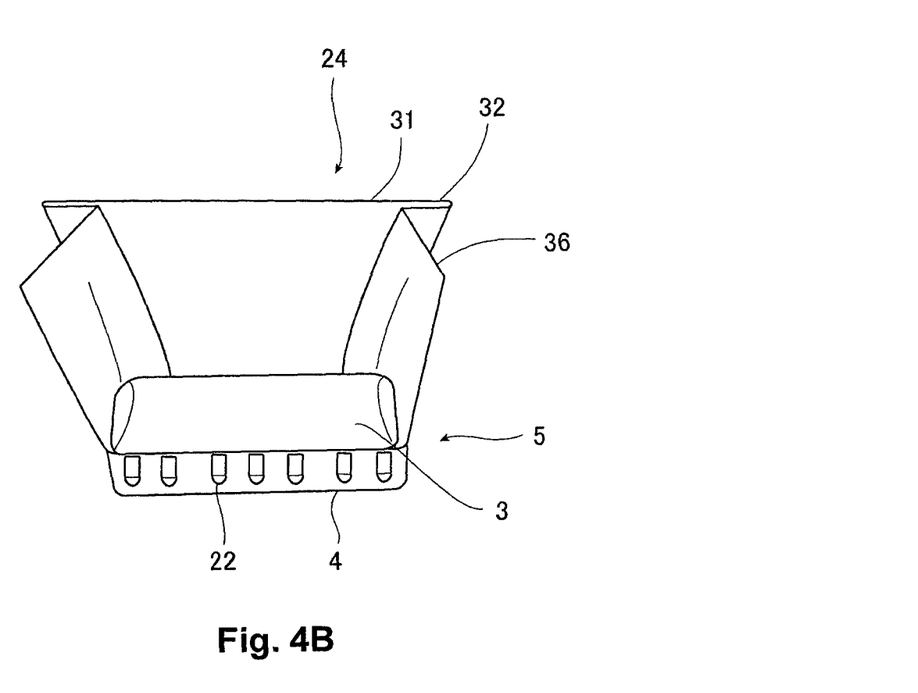
FIG. 4B is a view that shows a process of folding up the protective member subsequent to FIG. 4A.
Figure 4C:
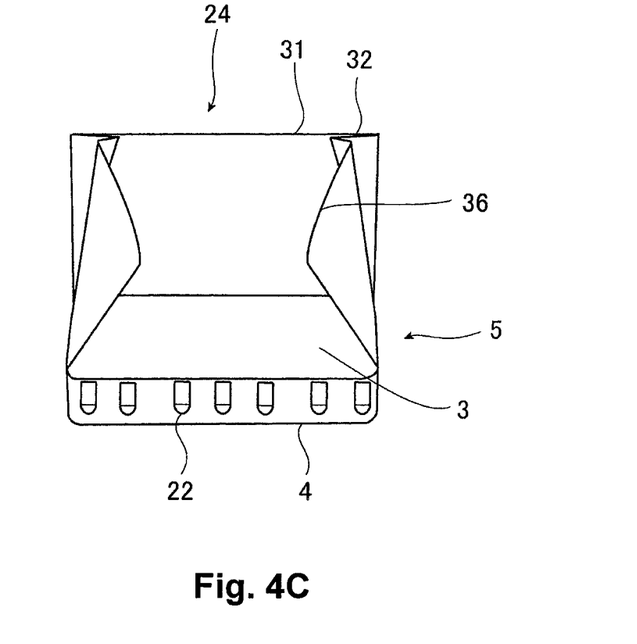
FIG. 4C is a view that shows a process of folding up the protective member subsequent to FIG. 4B.
Figure 4D:
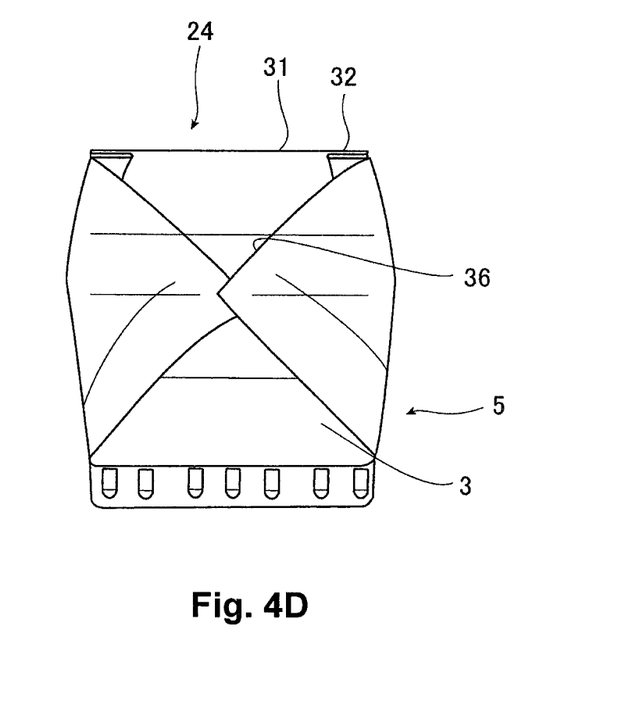
FIG. 4D is a view that shows a process of folding up the protective member subsequent to FIG. 4C.
Figure 4E:
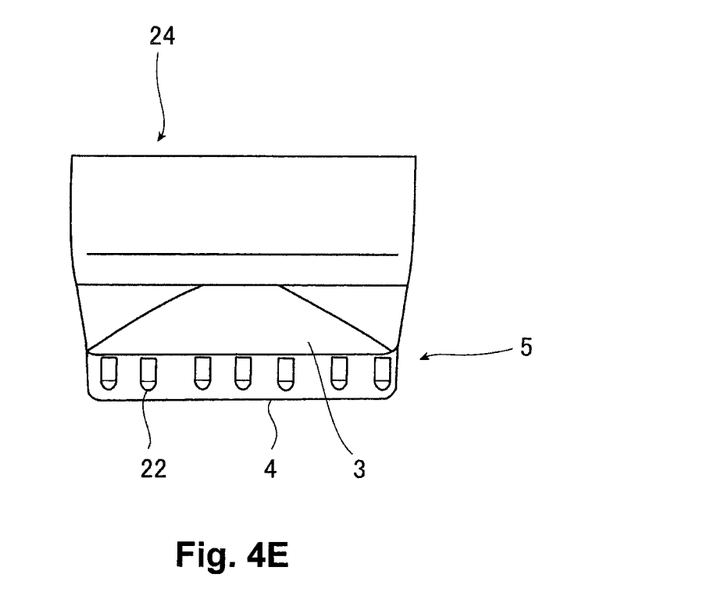
FIG. 4E is a view that shows a process of folding up the protective member subsequent to FIG. 4D.
Figure 4F:
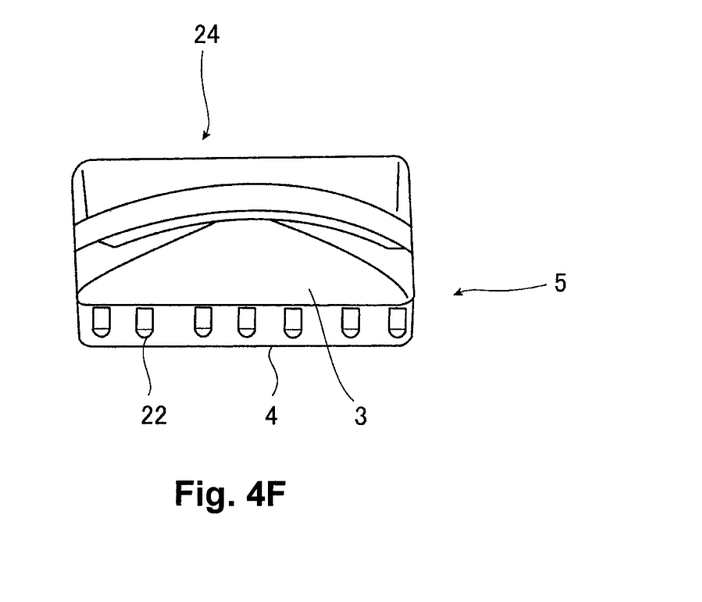
FIG. 4F is a view that shows a process of folding up the protective member subsequent to FIG. 4E.

As shown in FIG. 1 to FIG. 3, the above-described "peripheral portion protective section 32" is formed continuously and integrally with the main protective section 31. The peripheral portion protective section 32 has the same protruding amount as the peripheral portion 26, or protrudes outside in the width direction 35 with a greater amount than that.

Feature 2

In the above, the above-described protective member 24 has a side edge portion protective section 36 which covers at least a portion close to the above-described hinge section 17 in a side edge portion 10a in which the above-described hinge section 17 of the above-described opening section 10 is not provided.

Supplemental Explanation 2

Here, specifically, the above-described "side edge portion 10a in which the hinge section 17 of the opening section 10 is not provided" is right and left edge portions of the opening section 10 in this case.

The above-described "side edge portion protective section 36" is formed continuously and integrally with the peripheral portion protective section 32. The side edge portion protective section 36 can cover a part of or all of the side edge portion 10a.

As shown in FIG. 1, the portion (the expanded portion 24a) of the protective member 24 which is expanded from the opening section 10 is spread in a state of being continuous in a substantially C shape in planar view by the main protective section 31, the peripheral portion protective section 32, and the side edge portion protective section 36. With this configuration, protection of the hinge section 17 and the airbag main body 3 becomes possible with respect to three directions (backward of the vehicle, and the right and left directions).

Feature 3

As sequentially shown in FIG. 2, FIG. 4A to FIG. 4F, a portion outside the above-described main protective section 31 of the above-described protective member 24 is folded in toward a back surface side of the main protective section 31 with at least either one of pleat folding or inward folding so as to fit into a width size (the width size W2 of the hinge section 17) of the main protective section 31 (FIG. 4A to FIG. 4D), and thereafter the main protective section 31 is folded up in an accordion shape, together with the portion folded in to fit into the width size, so as to reduce the size of the airbag main body 3 in the expanding direction 23 as sequentially shown in FIG. 4E to FIG. 4F or FIG. 5(a) to FIG. 5(d).

Then, as shown in FIG. 7, the above-described protective member 24 folded up in an accordion shape is arranged in a portion on the above-described opening section 10 side of the above-described airbag main body 3.

Supplemental Explanation 3

Here, in this instance, the above-described "portion outside the main protective section 31" is at least a part of the peripheral portion protective section 32 or the peripheral portion protective section 32 and the side edge portion protective section 36 located outside in the width direction 35 with respect to the main protective section 31.

The above-described "back surface side of the main protective section 31" is a surface of the main protective section 31 opposite to the hinge section 17, and in this instance, a front side surface in the vehicle longitudinal direction.

The above-described "pleat folding" literally refers to folding (valley folding) in a pleat shape (pleat-folded section). The pleat folding can include V-shaped folding (onefold valley folding), W-shaped folding (twofold valley folding), or valley folding with three folds or more. In this embodiment, V-shaped folding (onefold valley folding) or the like is used. The fold width of the pleat folding is made approximately half or the like of the bulge amount of the portion outside the main protective section 31 in the width direction 35. In this embodiment, the fold width of the pleat folding is approximately 50 min. However, the fold width of the pleat folding is not limited to the above.

The above-described pleat folding can be called inward pleat folding or the like in a case of folding toward the center in the width of the main protective section 31. Alternatively, it can be called vertical pleat folding or the like in a case of folding along the longitudinal direction of the main protective section 31.

The above-described "inward folding" literally refers to folding the portion outside the main protective section 31 (including a state before the pleat folding and a state after the pleat folding) inward as a whole (inward-folded section).

As for the pleat folding and the inward folding, either one of them can be performed, or they can be combined.

The above-described "folding up in an accordion shape" refers to so-called accordion folding (or zigzag folding, winding folding) in which mountain folding and valley folding are alternately repeated and folding back is performed in an opposite direction continuously a plurality of times so as not to curl up (accordion-folded section). The fold width of the accordion folding is made smaller than the size of the above-described airbag module 5 in the depth direction (the vehicle longitudinal direction). In this instance, the fold width of the accordion folding is approximately half of the depth size if the airbag module 5 or is less than that. Also, the number of the accordion folding is approximately one mountain and half.

Figures 5A, 5B, 5C:
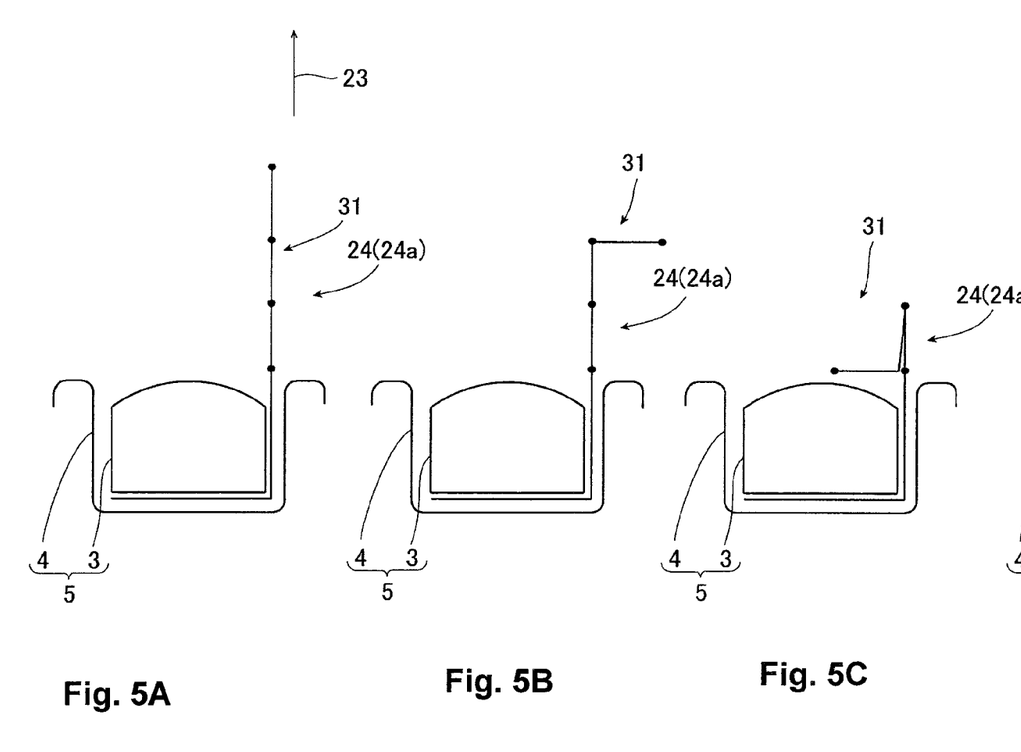
Figure 5D:
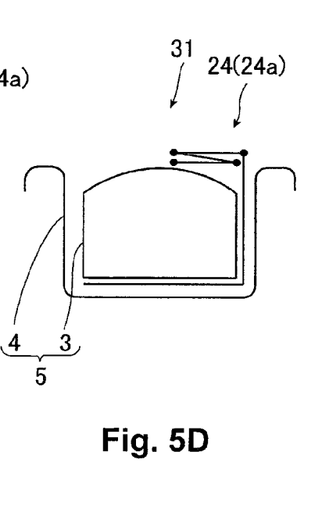

The way of the accordion folding will be explained in more detail. As shown in FIG. 5(a), a part which extends above the upper surface of the airbag module 5 is divided into three portions. Then, as shown in FIG. 5(b), the uppermost portion (referred to as a first portion) is folded backward in the vehicle. Next, as shown in FIG. 5(c), the intermediate portion (referred to as a second portion) is folded frontward in the vehicle together with the first portion. Finally, as shown in FIG. 5(d), the lower portion (referred to as a third portion) is folded frontward in the vehicle. In this manner, for example, the first portion, the second portion, and the third portion are overlapped such that the first portion is located on the lower side, the second portion is located in between, and the third portion is located on the upper side. However, the folding number of the accordion folding, the fold width, the folding shape, the folding process, and the like are not limited to the above.

The above-described "being arranged in a portion on the opening section 10 side of the airbag main body 3" refers to a state in which the above-described protective member 24 (the expanded portion 24a thereof) folded up in an accordion shape is set in a position close to the opening section 10 with respect to the airbag main body 3 by being mounted on the front surface (upper portion) of the folded airbag main body 3. As described above, the protective member 24 folded up in an accordion shape is securely retained so as not to move or collapse until being spread using the cover member 33, the press member, or the like.

Here, in terms of the structure, the lid section 9 can be made right and left opening. In such an instance, the above description is interpreted by interchanging the front and the back with the right and the left.

Operation

Hereinafter, the function of this embodiment will be explained.

When the airbag main body 3 is spread in case of an emergency, first, the spread airbag main body 3 breaks the cover member 33 or the press member, and at the same time, expands from the expanding port section 7 of the storing section 4 and presses the lid section 9 of the airbag lid member 8 so as to open the lid section 9 as shown in FIG. 8. Then, the airbag main body 3 expands from the opening section 10 which appears due to opening of the lid section 9 into the passenger compartment, and protects a passenger seated in a predetermined position of a seat by holding.

When the lid section 9 is opened, the lid section 9 is moved (rotated) toward the outside of the opening section 10 with the hinge section 17 being made an opening base point (an opening center).

In this instance, the airbag main body 3 and the hinge section 17 can be prevented from directly scraping against each other by causing the protective member 24 to stand between the airbag main body 3 and the hinge section 17. Accordingly, the hinge section 17 and the airbag main body 3 can be protected, and the hinge section 17 can also be protected from being damaged by the above-described scraping (friction force).

In this instance, as shown in FIG. 1 and FIG. 3, the protective member 24 is spread in three directions as a whole and opened in a substantially C shape in planar view by spreading the main protective section 31 and the peripheral portion protective section 32 toward the hinge section 17 side and spreading the side edge portion protective section 36 laterally.

Effect

According to this embodiment, the following effect can be achieved.

Operational Effect 1

By completely covering the entire hinge section 17 with the main protective section 31 of the protective member 24, the above-described protection of the hinge section 17 can be made more secure. Specifically, the hinge section 17 and the airbag main body 3 can be completely prevented from directly scraping against each other, and a portion which hinders sliding can also be prevented from being generated between the airbag main body 3 and the main protective section 31. Consequently, the hinge section 17 and the airbag main body 3 can be protected more effectively, and load (friction force) inputting to the hinge section 17 due to the above-described scraping or physical damage to the hinge section 17 due to the scraping can be prevented more securely.

Further, by covering the peripheral portion 26 which protrudes from both side of the hinge section 17 with the peripheral portion protective section 32 which is provided on both sides of the main protective section 31 in the lid section 9, the peripheral portion 26 and the airbag main body 3 can be prevented from directly scraping against each other, and sliding can be generated between the airbag main body 3 and the peripheral portion protective section 32. Consequently, the peripheral portion 26 and the airbag main body 3 can be protected, and load (friction force) put to the hinge section 17 due to the above-described scraping through the peripheral portion 26 can be prevented or reduced.

As described above, in particular, the portions on both ends in the width direction 35 of the hinge section 17 can be protected securely (can be protected directly and indirectly).

Operational Effect 2

Since the side edge portion protective section 36 of the protective member 24 covers at least a portion close to the hinge section 17 (that is, a portion on the outside and the front side of the peripheral portion protective section 32) in the side edge portion in which the hinge section 17 of the opening section 10 is not provided, the airbag main body 3 can be spread in a sliding manner by holding a part of the side edge portion of the airbag main body 3 with the side edge portion protective section 36. Consequently, the side edge portion protective section 36 receives at least a part of load to the airbag main body 3 acting on the lid section 9 from the outside of the above-described peripheral portion 26, which makes it possible to prevent the above-described load from inputting to the hinge section 17 through the peripheral portion 26 or reduce the input load.

Figure 6A:
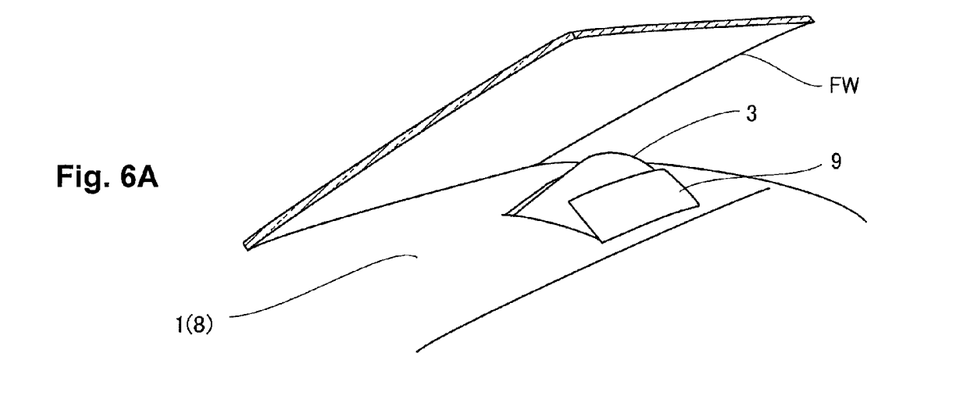
Figure 6B:
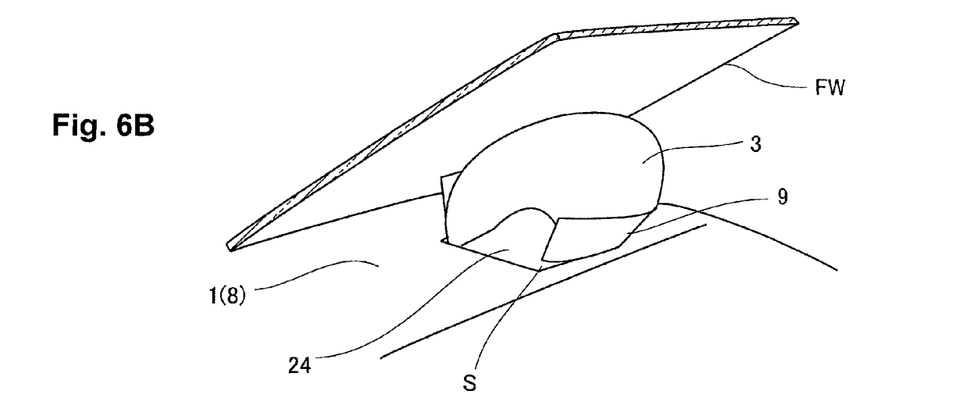
Figure 6C:
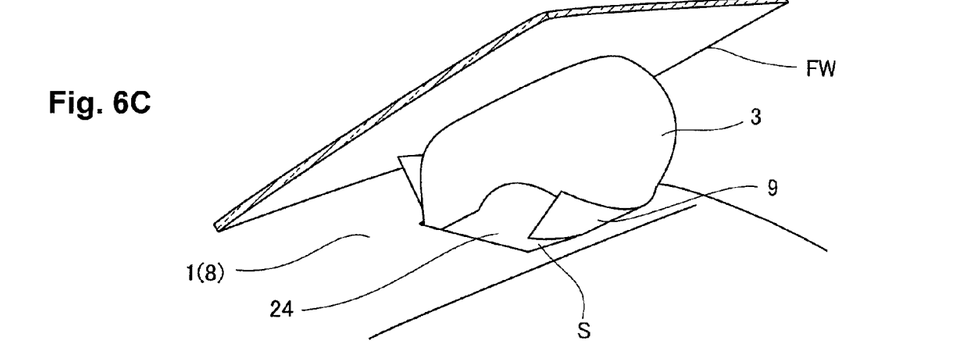

Further, as sequentially shown in FIG. 6(a) to FIG. 6(c), when the airbag main body 3 opens the lid section 9, the lid section 9 is deformed to temporarily greatly expand and a gap S might be generated temporarily between the opening section 10 and the portions on both ends of the lid section 9 (the above-described peripheral portion 26). However, the above-described gap S can be protected by the presence of the above-described peripheral portion protective section 32 and side edge portion protective section 36.

Incidentally, in FIG. 6, FW shows a front window glass of a vehicle.

Operational Effect 3

The protective member 24 (the expanded portion 24a thereof) folded up in an accordion shape is arranged in a portion on the opening section 10 side of the airbag main body 3 in a state where a portion outside the main protective section 31 of the protective member 24 is folded in toward a back surface side of the main protective section 31 with at least either one of pleat folding or inward folding so as to fit into a width size of the main protective section 31, and thereafter the main protective section 31 is folded up in an accordion shape, together with the portion folded in to fit into the width size, so as to reduce the size of the airbag main body 3 in the expanding direction 23. Therefore, the protective member 24 can be spread smoothly in accordance with spreading of the airbag main body 3. Also, the elements to be protected (the hinge section 17, the peripheral portion 26 of the lid section 9, and the portion in the outside thereof) can be covered securely with each section (the main protective section 31 and the portion outside the main protective section 31) of the spread protective member 24.

Although the embodiment of the present invention has been described in detail with reference to the drawings in the above, the embodiment is only an example of the present invention, and the present invention is not limited to the configuration of the embodiment. It will be apparent that change of design or the like can be included in the present invention as long as it does not depart from the scope of the present invention. It will also be apparent that in a case where each embodiment includes a plurality of configurations, for example, possible combinations of these configurations can be included in the present invention even though there is no description. It will also be apparent that in a case where a plurality of embodiments and modified examples are illustrated, possible ones of combinations of the configurations straddling these can be included in the present invention even though there is no description. It will also be apparent that the configurations shown in the drawings are included in the present invention even though there is no description. Further, the term "or the like" is intended to include equivalents. Also, the terms "substantially", "about", and "approximately" are intended to include a range or accuracy which can be accepted based on common sense. Also, the terms "part," "section,"

"portion," "member" or "element" when used in the singular can have the dual meaning of a single part or a plurality of parts.

What is claimed is:

1. An airbag device comprising:
   a bag-shaped airbag main body;
   a storing section storing the airbag main body in a state of being folded up, the storing section including an expanding port section formed on a surface thereof so that the airbag main body expands through the expanding port section;
   an airbag lid member having
      a lid section facing the expanding port section of the storing section, and configured and arranged to be opened by a pressing force of the airbag main body when the airbag expands, and
      an opening section that is formed when the lid section is opened;
   a hinge section coupling an edge portion of the opening section and the lid section of the airbag lid member to serve as an opening base point of the lid section; and
   a protective member configured and arranged to be disposed between the airbag main body and the hinge section, when the airbag main body expands, to protect the airbag main body and the hinge section, the protective member having
      a main protective section configured and arranged to cover the hinge section, and
      a peripheral portion protective section provided on both sides of the main protective section to cover at least a peripheral portion of the lid section which protrudes from both sides of the hinge section.

2. The airbag device according to claim 1, wherein the protective member further has a side edge portion protective section configured and arranged to cover at least a portion of the lid member adjacent to the hinge section in a side edge portion of the opening section in which the hinge section is not provided.

3. The airbag device according to claim 1, wherein the protective member is folded up in an accordion shape and arranged in a portion on a side of the opening section of the airbag main body in a state where a portion outside the main protective section of the protective member is folded in toward a back surface side of the main protective section with at least one of pleat folding and inward folding so as to fit into a width size of the main protective section, and thereafter the main protective section is folded up in the accordion shape, together with the portion folded in, so as to reduce a size of the airbag main body in an expanding direction.

4. The airbag device according to claim 2, wherein the protective member is folded up in an accordion shape and arranged in a portion on a side of the opening section of the airbag main body in a state where a portion outside the main protective section of the protective member is folded in toward a back surface side of the main protective section with at least one of pleat folding and inward folding so as to fit into a width size of the main protective section, and thereafter the main protective section is folded up in the accordion shape, together with the portion folded in, so as to reduce a size of the airbag main body in an expanding direction.

* * * * *